United States Patent [19]

Roerig et al.

[11] Patent Number: 5,060,357

[45] Date of Patent: Oct. 29, 1991

[54] SELF-LOADING CONTROLLED DEFLECTION ROLL

[75] Inventors: Arnold J. Roerig, Beloit; Dale A. Brown, Milton, both of Wis.

[73] Assignee: Beloit Corporation, Beloit, Wis.

[21] Appl. No.: 541,678

[22] Filed: Jun. 21, 1990

[51] Int. Cl.[5] .............................................. B21B 31/32
[52] U.S. Cl. .................................. 29/113.2; 29/116.2
[58] Field of Search ................. 29/113.1, 113.2, 116.2, 29/129

[56] References Cited

U.S. PATENT DOCUMENTS

| 3,885,283 | 5/1975 | Biondetti . | |
|---|---|---|---|
| 4,186,472 | 2/1980 | Biondetti . | |
| 4,301,582 | 11/1981 | Riihinen . | |
| 4,485,540 | 12/1984 | Riihinen . | |
| 4,751,775 | 6/1988 | Kubik | 29/116.2 |
| 4,757,586 | 7/1988 | Niskanen | 29/116.2 |
| 4,805,279 | 2/1989 | Pav | 29/116.2 |
| 4,821,384 | 4/1989 | Arav | 29/116.2 X |
| 4,850,088 | 7/1989 | Speak . | |
| 4,852,229 | 8/1989 | Crouse | 29/116.2 |
| 4,864,703 | 9/1989 | Biondetti et al. . | |
| 4,919,761 | 4/1990 | Schiel et al. | 29/116.2 X |
| 4,931,142 | 6/1990 | Steiner et al. | 29/116.2 X |

Primary Examiner—Timothy V. Eley
Assistant Examiner—C. Richard Martin
Attorney, Agent, or Firm—Dirk J. Veneman; Raymond W. Campbell; Gerald A. Mathews

[57] ABSTRACT

A self-loading controlled deflection roll for forming a pressure nip with another roll has at least one support shoe mounted in a stationary support shaft for controlling the deflection of the roll shell in the direction of the nip. At either end of the controlled deflection roll, a pair of opposed guide shoes are slidably mounted on the stationary support shaft to apply pressure against the roll shell to stabilize the position of the roll shell relative to the stationary shaft. At least one guide shoe on either end of the roll is equipped with a compensating piston to permit its face surface to move radially outwardly relative to the guide shoe support on the stationary shaft. The guide shoes slidably reciprocate in planes parallel to the plane of the nip through the longitudinal axis of the roll and provide opposed, equal stabilization forces at substantially right angles to the plane of the nip. The guide shoes also have axially extending pads for bearing against annular end surfaces on the roll shell to maintain the roll shell fixed in the longitudinal direction relative to the support shaft during operation.

12 Claims, 7 Drawing Sheets

SELF-LOADING CONTROLLED DEFLECTION ROLL

BACKGROUND OF THE INVENTION

1. FIELD OF THE INVENTION

This invention relates to a controlled deflection roll such as is used in the press and calender sections of a papermaking machine. More particularly, this invention relates to a self-loading type of controlled deflection roll wherein the roll shell can translate relative to the longitudinal axis of the roll. Still more particularly, this invention relates to a self-loading controlled deflection roll wherein the roll shell is both rotatably and positionably supported solely by hydraulically actuated shoes on a stationary shaft. Even still more specifically, this invention relates to an adjustably positionable side guide shoe apparatus for stabilizing the roll shell in a self-loading type of controlled deflection roll.

2. DESCRIPTION OF THE PRIOR ART

A prior self-loading type of controlled deflection roll is described and illustrated in Biondetti, U.S. Pat. No. 3,885,283. In this patent, the roll shell is hydrostatically supported in the direction of its nip with another roll by a plurality of shoes which are aligned longitudinally along the length of the stationary support shaft. A pair of collars, each having a pair of flat, parallel surfaces, are disposed at either end of the roll shell to slide over corresponding surfaces on the roll shaft to permit the roll shell to translate reciprocally in the direction of its nip with another roll while maintaining the roll shell in a fixed position relative to the shaft in a plane perpendicular to a plane through the nip with another roll. The roll shell rotates on bearings mounted to each of the collars.

Other patented controlled deflection rolls utilize magnets to compensate and adjust for deflection of a rotating, bearing supported roll shell over a stationary support shaft. Still other patents relating to self-loading controlled deflection rolls disclose support of the roll shell relative to the shaft by a plurality of circumferentially spaced shoes which position the rotating roll shell at predetermined radial positions about the roll shaft according to the circumferential position of the roll shaft.

In Arav, U.S. Pat. No. 4,821,384, diametrically opposed nip loading shoes are positioned in the stationary shaft of a controlled deflection roll to move the roll shell radially inwardly and outwardly in opposed directions relative to the shaft. In some embodiments, stabilizing shoes are located circumferentially about the roll shaft outside of the plane of the nip loading shoes which actuate the roll shell. The stabilizing shoes move outwardly relative to the longitudinal axis of the roll shaft and also slide along flat surfaces on the roll shaft parallel to the plane of the support shoes and the nip.

Regardless of the configuration of prior self-loading controlled deflection rolls, none of them can provide constant roll shell stabilizing force in a configuration where the roll shell is not mounted on bearings, or where there are dimensional variations in the roll, or both, particularly in rolls utilizing hydraulically actuated stabilizing shoes. Thus, the prior self-loading type of controlled deflection rolls cannot accommodate dimensional variations between the roll shell and stationary shaft due to manufacturing tolerances and temperature changes which affect different components in different degrees depending on the co-efficient of thermal expansion of their materials. For example, in some prior designs of self-loading rolls, the pressurized hydraulic fluid could escape more quickly from one stabilizing shoe, or at the interface of a stabilizing shoe and the supporting roll shaft at one location than at another. This could cause variations in the stabilizing pressures provided between the shaft and inner surface of the roll shell and thus permit the roll shell to shift its radial position laterally of the plane of the nip, or even to oscillate relative to the shaft.

Further, in some instances, such as when the tolerances become negative, stabilizing shoes interposed between the shaft and roll shell can become wedged between the shaft and roll shell and act as a brake to the detriment of the intended method of operation.

SUMMARY OF THE INVENTION

The disadvantages and deficiencies of the prior types of self-loading controlled deflection rolls equipped with means to stabilize roll shell motion relative to the roll shaft have been obviated by this invention. No bearings are required or used to rotatably support the roll shell about the roll shaft. This permits reduced rotational friction as well as operation at temperatures higher than those which can be sustained by bearings. In this roll, a pair of opposed guide shoes are provided at either end of the controlled deflection roll to stabilize the roll shell. They are mounted on the stationary roll shaft to move in parallel, spaced planes in the direction of roll shell support shoes which move the roll shell translationally relative to the shaft into and out of nipping engagement with another roll. All of the support and guide shoes are hydraulically actuated and have faces adapted to hydrostatically or hydrodynamically support a film of lubricating oil at their interface with the roll shell. The roll shell is thus solely supported at each end of the roll by three or four hydraulically actuated shoes circumferentially spaced about the shaft. In addition, one of the guide shoes at either end of the roll is equipped with a compensating piston to allow for variations in dimensions between parts, whether due to manufacturing tolerances or to changes due to temperature. The guide shoes can thereby uniformly stabilize the location of the roll shell in a direction substantially transverse to the direction of movement of the roll shell into and out of nipping engagement with another roll.

This invention permits the guide shoes to provide opposed stabilizing pressure of a constant force against the roll shell regardless of the position of the roll shell radially toward or away from the nip with another roll, or regardless of small movements of one, or the other, of the guide shoes radially relative to the support shaft. The constant force of the guide shoes against the inner surface of the roll shell is provided by the function of the compensating piston which maintains the thickness of the pressurized film of hydraulic fluid essentially the same over the faces of both guide shoes at all times during operation. Since the face area of both of the opposed guide shoes is the same, their stabilizing force exerted against the roll shell will also be the same regardless of slight radial movement of the compensating piston relative to the roll shaft. Naturally, it is recognized that if the stabilizing faces of the guide shoes were of different areas, the stabilizing forces exerted by opposing guide shoes would be the same with different unit pressures over their surfaces.

Accordingly, it is an object of this invention to provide a self-loading type of controlled deflection roll which does not utilize roller bearings to rotatably support and stabilize the roll shell.

Another object of this invention is to provide a self-loading type of controlled deflection roll having guide shoes for providing stabilizing force against the roll shell.

Still another object of this invention is to provide a self-loading controlled deflection roll having guide shoe apparatus which can accommodate dimensional variations in the apparatus due to manufacturing tolerances and thermal expansion while providing substantially uniform stabilizing support of the rotating roll shell.

Another object of this invention is to provide a self-loading type of controlled deflection roll which can be operated at high temperatures or reduced rotational friction, or both.

A feature of this invention is the provision of a compensating piston within at least one of each pair of guide shoes at each end of the roll.

Another feature of this invention is that concentricity of the rotating roll shell relative to its axis of revolution is maintained with great accuracy.

An object, advantage and feature of this invention is that substantially equal, opposed stabilizing forces are applied to substantially diametrally located positions on the inner surface of the roll shell regardless of variations in the internal dimensions of the roll due to manufacturing tolerances and thermal expansion.

Another feature of this invention is that the face area of the opposed guide shoes can be made unequal to provide for a specific external side load such as a gearbox.

These, and other objects, features and advantages of this invention will become readily apparent to the artisan upon reading the description and claims of this invention in conjunction with the attached drawings.

DESCRIPTION OF THE PREFERRED EMBODIMENTS

Figure 1:
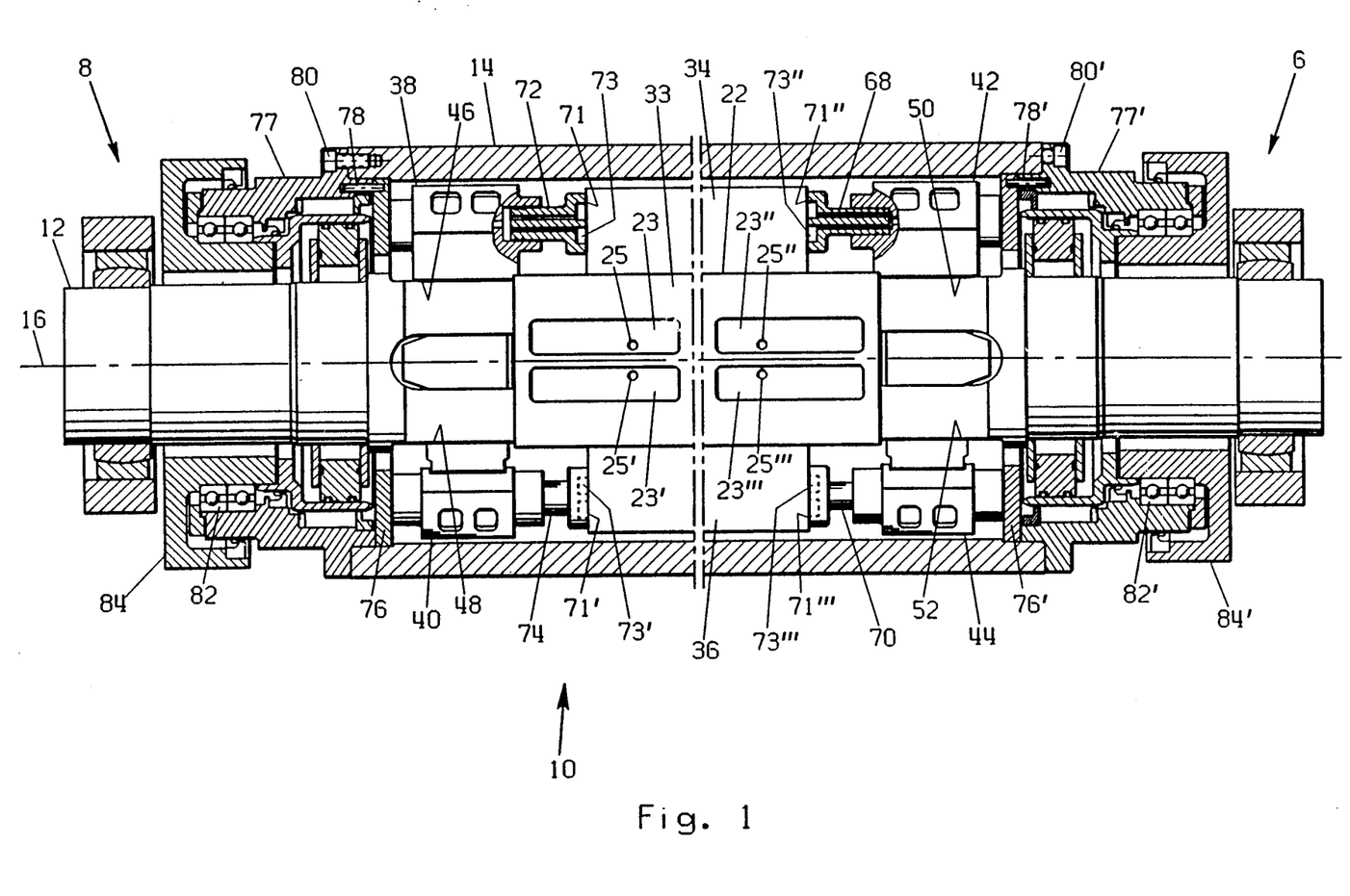
FIG. 1 is a plan view of a self-loading controlled deflection roll of this invention with the roll shell broken away to more clearly illustrate the internal components of the roll.
Figure 2:
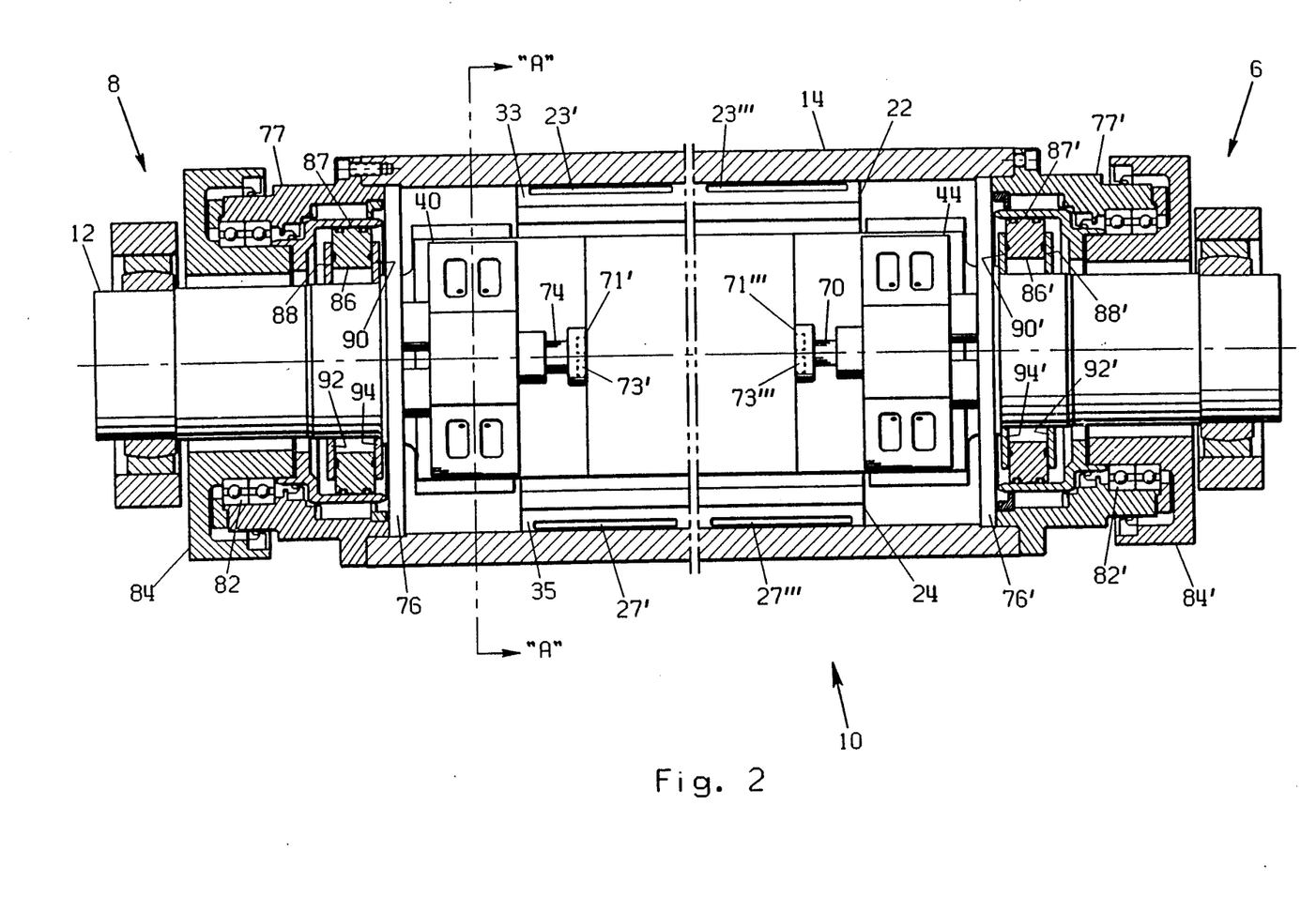
FIG. 2 is a side-elevational view of the self-loading controlled deflection roll of this invention as shown in FIG. 1, also with the roll shell broken away to more clearly illustrate the internal components of the roll.
Figure 3:
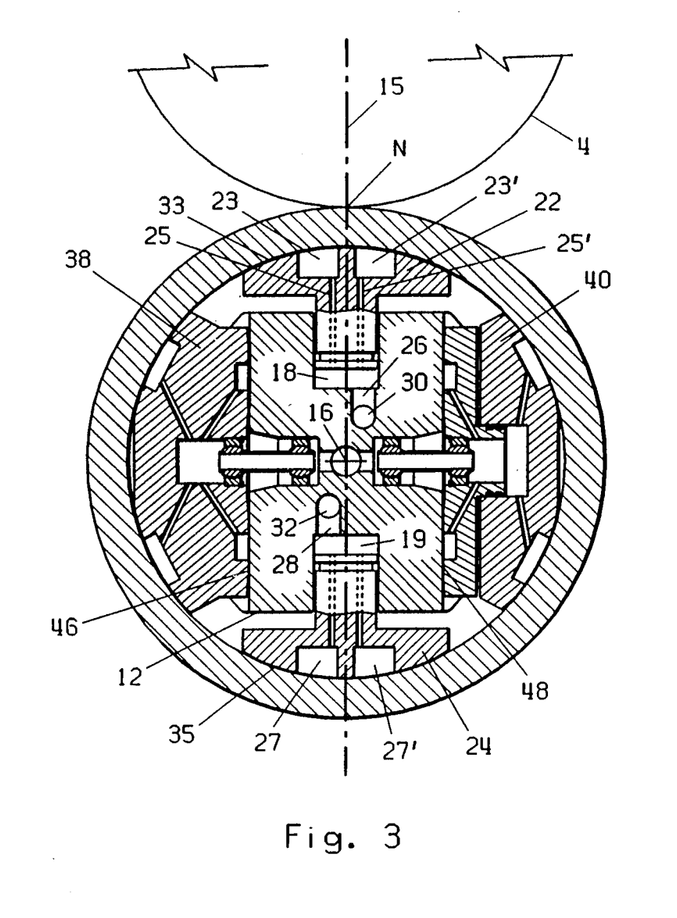
FIG. 3 is an end-elevational view of the roll shown in FIG. 2 through section "A"—"A" thereof.
Figure 3A:
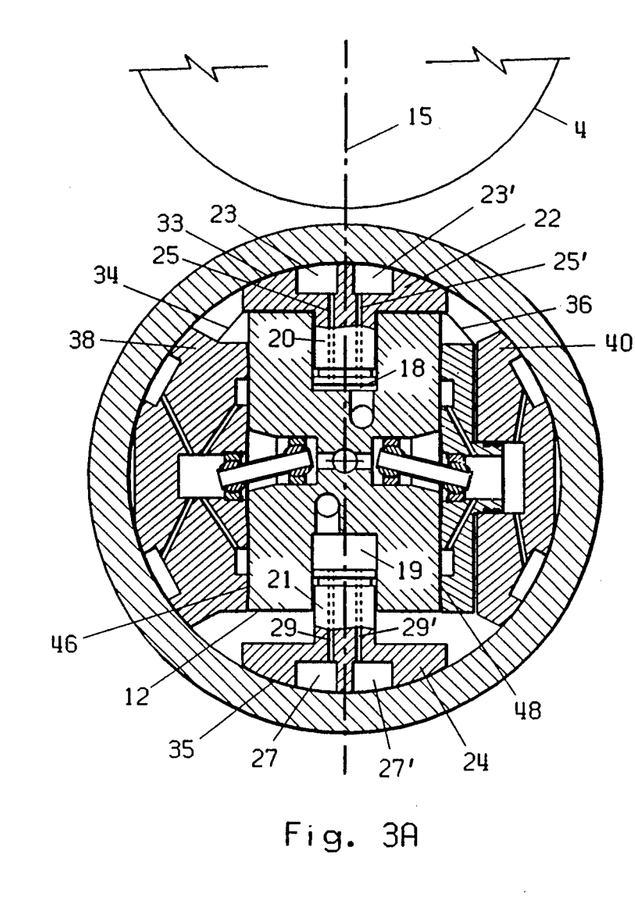
FIG. 3A is an end-elevational view of the roll, in section and similar to FIG. 3, but showing the roll shell in a lowered position.

As shown in FIG. 1, a self-loading controlled deflection roll 10 has a center stationary support shaft 12 and a hollow cylindrical roll shell 14. In such a self-loading roll, the roll shell is intended to be moved translationally into nipping engagement with another roll 4 along a nip line of contact N in a nip plane 15 through the nip line N and the longitudinal axis 16 of the roll 10, which nip plane is shown more clearly in FIG. 3. In other words, in FIG. 1, the nip plane is shown as a line coincident with the longitudinal axis 16, while in FIG. 3, the nip plane 15 is shown as a vertical line having both the nip line N and the longitudinal axis 16 in the plane.

In the following discussion, corresponding elements in the various configurations or embodiments in the different figures, particularly FIGS. 5, 6 and 7, will be correspondingly numbered with different letter suffixes used to differentiate between similar elements in different figures. In the same manner, corresponding elements in the same component are designated with the same numeral, but with a different number of prime superscripts.

Referring to FIGS. 1, 2, 3 and 3A, support shaft 12 has one or more hydraulic chambers, or cylinders, 18, 19 formed in it on opposed sides to receive the piston ends 20, 21 of opposed support shoes 22, 24 which extend toward and away from nip N along the nip plane. These support shoes are hydraulically actuated by pressurized hydraulic fluid which is supplied to conduits 26, 28 and then to the chambers from an outside source, such as a pump (not shown) via central load shoe conduits 30, 32. Support shoes 22, 24 have support faces 33, 35 which bear against, and thus support, the roll shell and load it into and out of nipping engagement along the nip plane by supplying pressurized hydraulic fluid to the one or more support shoes 22, 24 along one side, such as the lower side shown in FIG. 3A, while permitting the evacuation of pressurized fluid from the hydraulic chamber, or cavities, supplying the single support shoe 22 shown in the upper side of the roll shown in FIG. 3A. It is not illustrated, but well-known to the artisan, to replace the single support shoes 22, 24 shown with multiple, longitudinally aligned, shoes which may be either the hydrostatic or hydrodynamic type.

The upper support shoe 22 shown in FIG. 1 is a one piece shoe which extends for essentially the entire effective face length of the roll shell. Its support face contains at least four cavities, or recessed pockets 23, 23', 23", 23''', which receive pressurized hydraulic fluid via throttling conduits 25, 25', 25", 25''' linking these pockets with the chamber 18 beneath the piston end 20 of the support shoe 22. Lower support shoe 24 has similar pockets 27 in its face which are supplied with hydraulic lubricating fluid via similar conduits 29 from a similar chamber 19.

As shown more clearly in FIG. 1, the support shaft 12 has laterally extending side bodies 34, 36 which extend substantially perpendicular to the nip plane. They are used in conjunction with longitudinally extending positioning pistons bearing against guide shoes as will be described subsequently.

Near either end of the roll shell, spaced inwardly thereof, are a pair of opposed guide shoes 38, 40 and 42, 44. A corresponding pair of parallel planar guide surfaces 46, 48 and 50, 52 are formed in the support shaft and are arrayed in planes parallel with the nip plane. A guide shoe conduit 54 (FIG. 5) within the support shaft 12 is linked with each of the guide shoes 38, 40, 42, 44 by hydraulic feed lines 55, 55' to supply pressurized hydraulic fluid to each of the guide shoes from a pressurized source, such as a pump (not shown).

Figure 4:
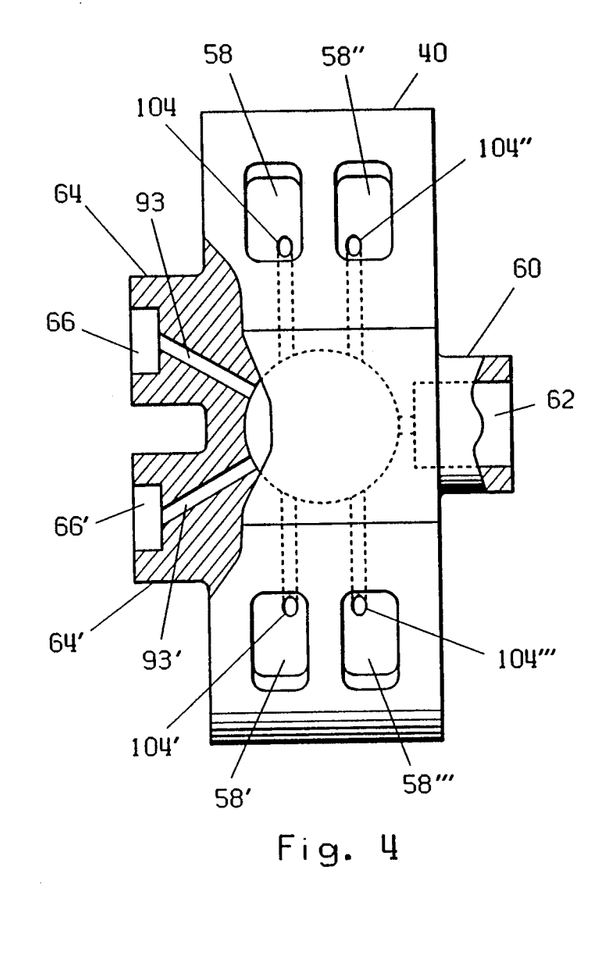
FIG. 4 is a side view of a guide shoe.
Figure 4A:
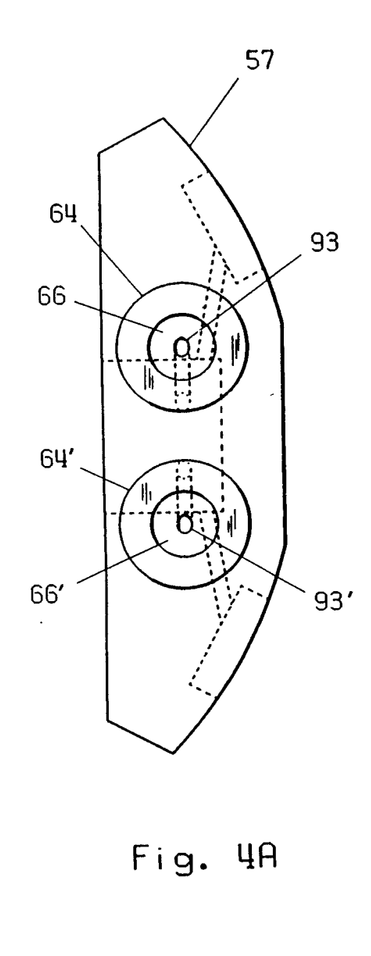
FIGS. 4A and 4B are end views of the guide shoe shown in FIG. 4.
Figure 4B:
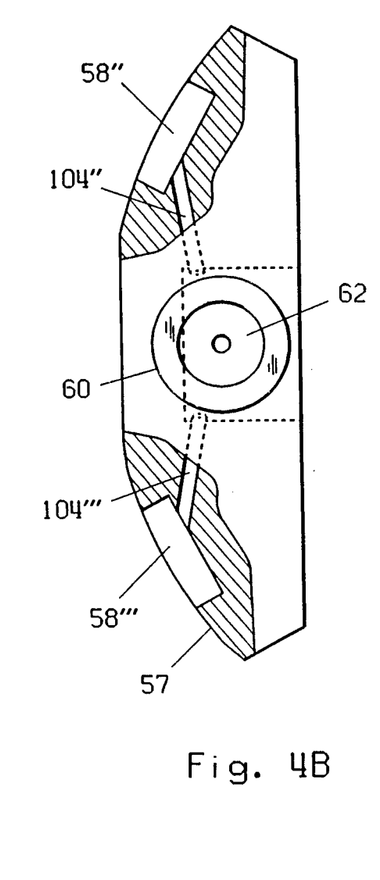

As shown in FIGS. 4, 4A and 4B, each of the guide shoes has a guide face 57 in which a plurality of recessed pockets 58, 58', 58'', 58''' are formed. On one end of each guide shoe, that is, the end which extends inwardly toward the center of roll 10, is a pad 60 having a bore 62 extending partially through from its outer end. On the other end of the guide shoes, on the end facing outwardly toward the ends of the roll, are a pair of adjacent, laterally spaced pads 64, 64', each of which includes a recessed pressure cavity 66, 66'.

Pressurized hydraulic fluid is supplied to cavities 66, 66' via throttling conduits 93, 93', and to pockets 58, 58', 58'', 58''' via throttling conduits 104, 104', 104'', 104''' to provide lubrication to their interfaces with contiguous surfaces of the roll.

As shown more clearly in FIG. 1, the guide shoes 42, 44 on the rear end 6 of the roll 10 are equipped with pistons 68, 70 which are normally bottomed out in their bore in their pad. In the guide shoes 38, 40 on the front end 8 of the roll, pistons 72, 74 are shown extended somewhat in the bores in their pads. The faces 71, 71', 71'', 71''' of these pistons have chambers or pockets 73, 73', 73'', 73''' which are hydraulically actuated and bear against the side bodies 34, 36 of support shaft 12.

The roll shell is therefore supported in the nip plane solely by upper and lower support shoes 22, 24 which extend substantially for the effective face length of the roll shell. At either end of the roll, a flat, annular disc 76, 76' is secured to a cylindrical collar 77, 77' by pins 78, 78' The collar is bolted to the ends of the roll shell by a plurality of cap screws 80, 80'. At the distal end of each collar 77, 77', a bearing 82, 82' is located to position the collar from an annular head 84, 84'. Axially inwardly from each bearing is a seal 86, 86' which has an outer, cylindrical surface 87, 87' which bears against the cylindrical inner surface of the head 84, 84'. Seals 86, 86' also have parallel faces 88, 88', 90, 90' which engage disc-like rings 92, 92', 94, 94' which are attached to the support shaft. The cylindrical surfaces 87, 87' of seals 86, 86' thus slidingly engages the cylindrical inner surface of each head 84, 84' to seal that interface in the axial direction, while the interfaces between seal faces 88, 88', 90, 90' and annular rings 92, 92', 94, 94' seal against movement of the roll shell translationally relative to shaft 12.

Figure 5:
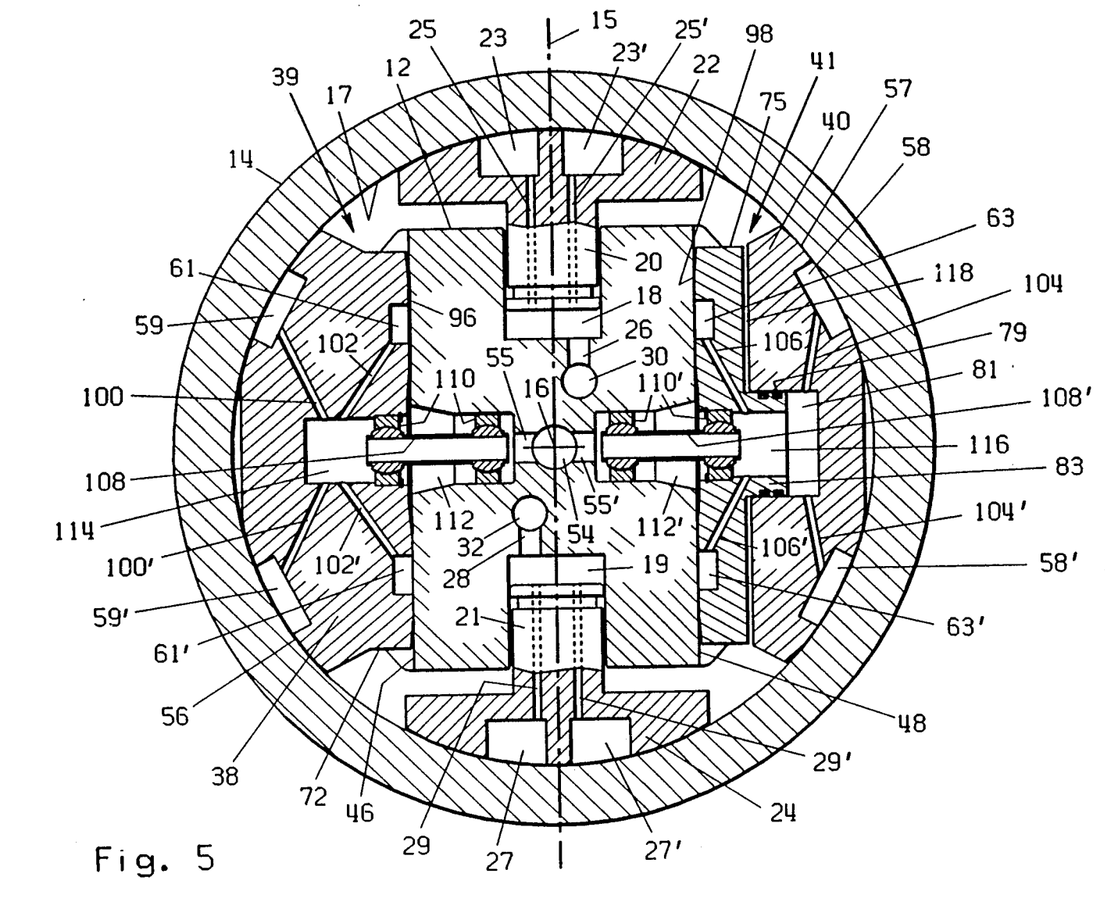
FIG. 5 is an end-elevational view, in section similar to FIG. 3, showing the opposed roll shell support pistons and the opposed guide shoes, with a compensating piston in one of the guide shoes.

Referring to FIG. 5, one guide shoe assembly 39 has a guide shoe 38 having a stabilizing face 56 for engaging the inner surface 17 of the roll shell and a portion 72 having a support face 96 for engaging the guide surface 46 on the support shaft 12. On the other side of the support shaft is a guide shoe assembly 41 which comprises an outer guide shoe member 40 (shown in FIGS. 4, 4A, 4B) having a stabilizing face 57 for engaging the inner surface of the roll shell and a compensating piston shoe member 75 having a support face 98 for engaging the guide surface 48 on the support shaft 12 which is parallel to the guide surface 46 on the other side of the support shaft.

Within each of the outer, stabilizing faces 56, 57 of each guide shoe 38, 40 are one or more recessed pockets 59, 59', 58, 58', respectively, and within each of inner, support faces 96, 98 are one or more recessed pockets 61, 61', 63, 63' for receiving pressurized hydraulic fluid to provide lubrication and pressure to the respective interfaces. These pockets, or cavities, are supplied by throttling conduits, such as hydraulic feed lines 100, 100', 102, 102', 104, 104', 106, 106', which are in turn fed from the central hydraulic conduit 54 and lines 55, 55' via tubes 108, 108' which are pivotally mounted in spherical bushings 110, 110' linking central conduit 54 with a chamber 114, 116 in, or beneath, shoes 38, 40.

It can be seen that chamber 116 provides a source of pressurized hydraulic lubricant to shoe 40, and to the bore chamber 81 intermediate the outer guide shoe member 40 and compensating shoe member 75 to provide hydraulic pressure and force to the underside of outer guide shoe member 40 relative to compensating shoe member 75. This will increase or decrease the gap 118, which is the interface between members 40, 75, as guide shoe 40 moves relative to compensating shoe 75 due to changes in the dimensions of the various components of the roll due to both thermal expansion of the members having different coefficients of expansion, as well as due to dimensional variations due to differences in manufacturing tolerances. Chambers 114, 116 also provide lubricating fluid to the family of pockets 58, 59, 61, 63, 66 and 73 which all function as hydrostatic bearings in a well-known manner.

Figure 6:
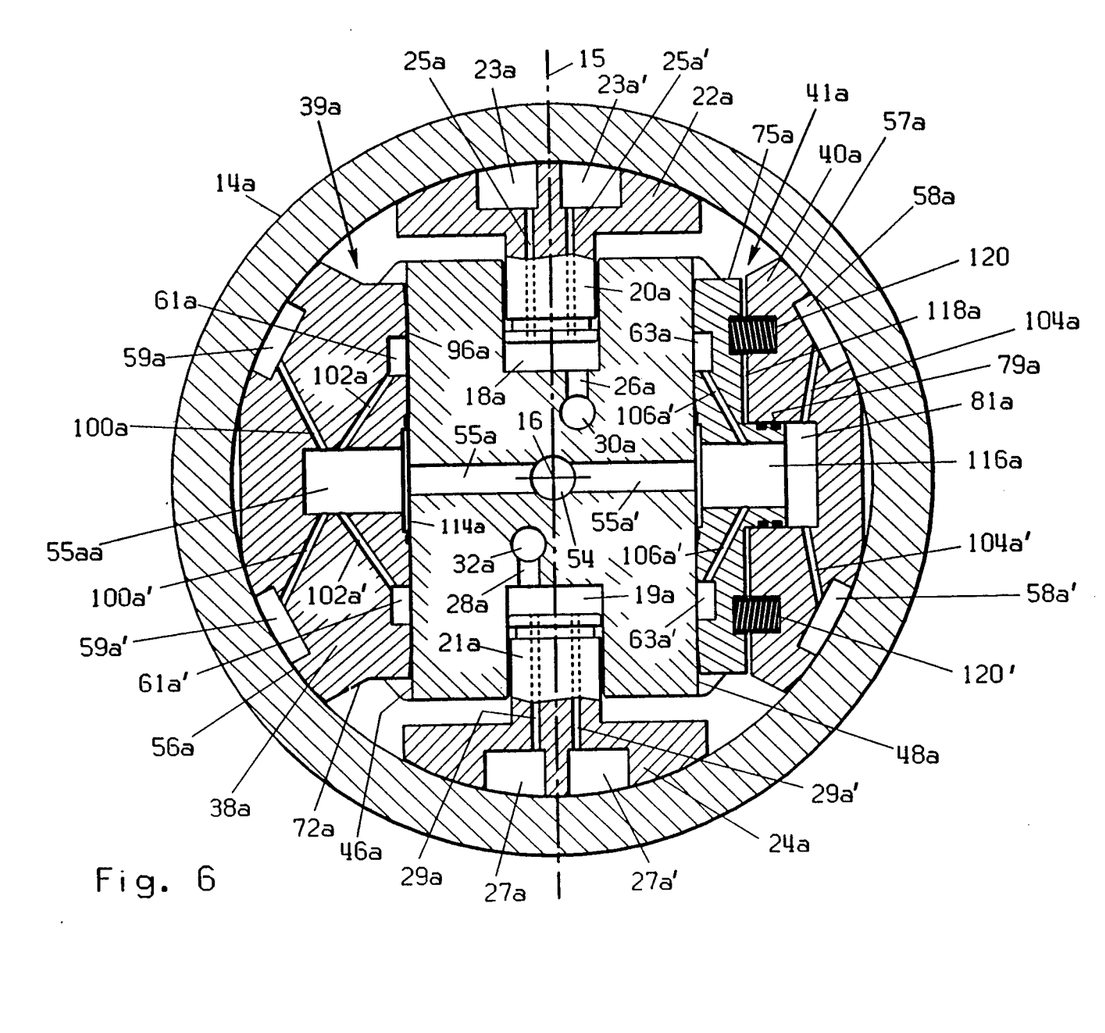
FIG. 6 is an end-elevational section view of the roll, similar to FIG. 5, but showing a different configuration of the guide shoe and compensating piston.

Referring now to FIG. 6, a roll having a different configuration of the guide shoe assembly 41a having the compensating piston is shown. In this embodiment, chamber 114a essentially comprises a relief in shoe 38a. An extension 55aa of conduit 55a with the throttling hydraulic lines 100a, 100a', 102a, 102a' feeding their respective pockets in the same manner as described in conjunction with the embodiment shown in FIG. 5. In the guide shoe assembly 41a, the outer guide shoe 40a is biased radially outwardly relative to guide surface 48a and compensating piston member 75a by one or more springs 120, 120' mounted in opposed recesses in members 40a, 75a. This spring arrangement thus maintains the support face 57a of the guide shoe 40a against the inner surface of the roll shell regardless of radial movement of the roll shell normal to the plane 15a through the support shoes 22a, 24a. If strong enough, the springs themselves could provide the stabilizing force of the guide shoe faces against the roll shell.

Figure 7:
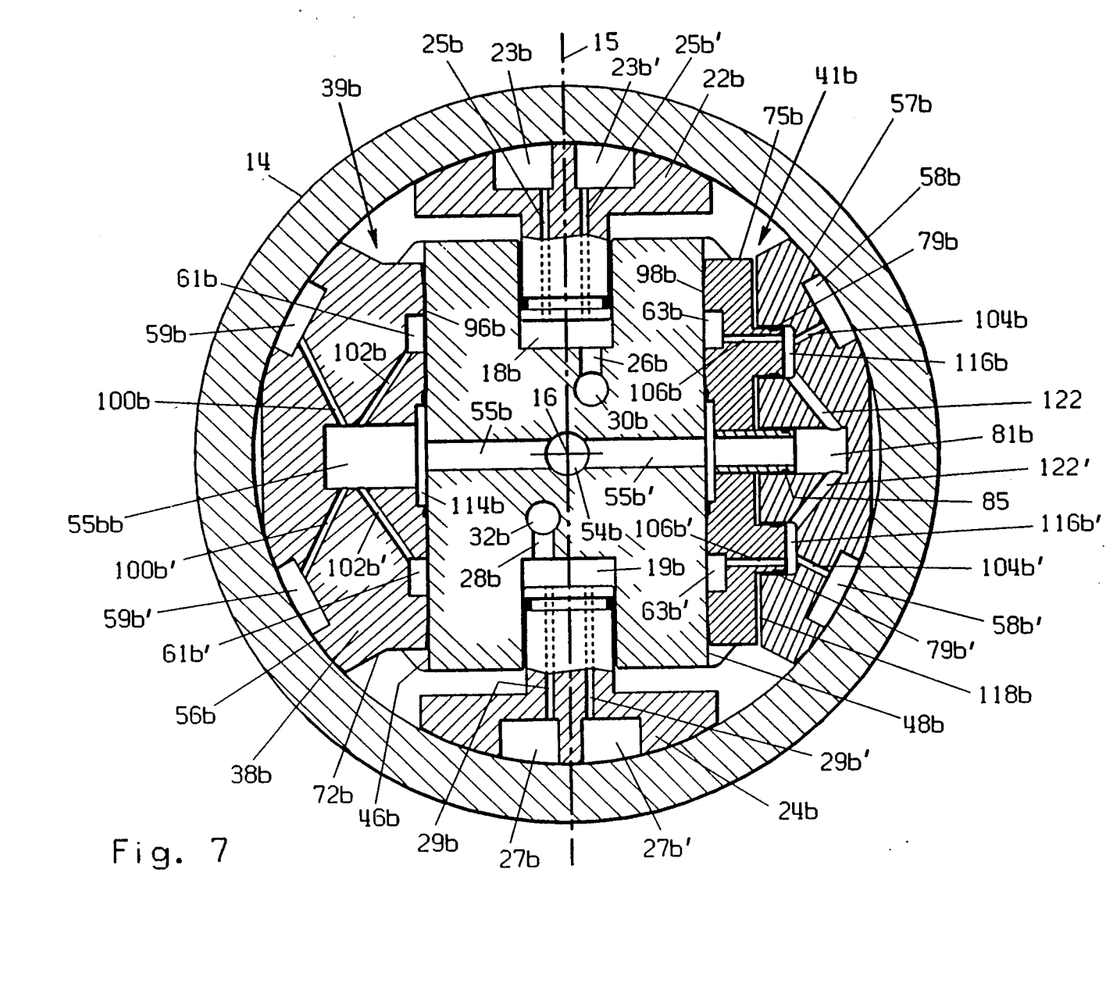
FIG. 7 is an end-elevational section view of a roll, similar to FIGS. 5 and 6, but showing still another configuration of a guide shoe and compensating piston.

In FIG. 7, another guide shoe assembly 41b is shown which does not utilize springs to bias the outer guide shoe relative to the compensating piston. In this embodiment, chambers 116b, 116b' are supplied with pressurized hydraulic fluid via conduits 122, 122'. Chambers 116b, 116b', in turn, supply throttling lines 104b, 104b', 106b, 106b' with pressurized hydraulic lubricant to provide lubrication in the pockets 58b, 58b', 63b, 63b', respectively. The hydraulic pressure in chambers 116b, 116b' thus operates to maintain the outer shoe member 40b biased against the inner surface of the roll shell while maintaining the face 98b biased against the support surface 48b on the roll shaft despite variations in the radial distance between the longitudinal axis 16 and the inner surface of the roll shell.

In operation, with particular reference to FIGS. 1 and 5, pistons 68, 70, 72, 74 are hydraulically actuated to position and maintain the roll shell axially relative to the center shaft by providing pressure between the guide shoes 38, 40, 42, 44 and the side body portions 34, 36 of the center shaft 12. Pistons 68, 70 are maintained in the bottoms of the bores and their respective pads to establish an operating position, while the pistons 72, 74 are pressurized in their extended position to maintain the established position of the roll shell axially relative to the shaft.

Pressurized fluid is also supplied through conduits 104, 104', 104'', 104''' and 93, 93' to their respective pockets 58, 66 to lubricate their interface with the roll shell (58/17) and with the disc (66/76).

Support shoe piston members 20, 21 are actuated, or deactuated, as desired, to translationally position the roll shell relative to the longitudinal axis 16 of the roll and to bring the roll shell into, or out of, loading engagement with another roll along a nip line of contact N in the nip plane 15 which extends axially along the longitudinal axis 16 and through each of the support shoes 22, 24. The hydraulic pressure to, or from, chambers 18, 19 to pressurize or relieve the pressure on piston members 20, 21 of the support shoes is provided through central load conduits 30, 32 and support shoe conduits 26, 28 leading to chambers 18, 19.

With reference to FIG. 5, the central guide conduit 54 is pressurized with hydraulic fluid which travels radially outwardly through feed lines 55, 55' through hollow tubes 108, 108' to chambers 114, 116 beneath guide shoe assemblies 39, 41. The hydraulic fluid feed tubes 108, 108' are mounted with their inner ends pivotally secured in a bore 112, 112' in shaft 12 with a spherical bushing 110, 110' to provide limited arcuate motion while maintaining a seal relative to the pressurized hydraulic fluid within feed lines 55, 55'. In a similar manner, the outer ends of the hydraulic tubes 108, 108' are mounted in the end 72 in the guide shoe 38 and in the compensating piston member 75 in the guide shoe assembly 41. The inner ends of tubes 108, 108' are free to slide in their respective bores to accommodate the arcuate motion.

Actuation of the upper or lower support shoes 22, 24 and the corresponding deactuation of the opposed support shoe, or shoes, causes the roll shell 14 to move translationally in the nip plane. When this happens, in order to maintain the roll shell rotationally stable during operation, guide shoes 38, 40 must also slide up and down a corresponding distance with faces 96, 98 in sliding engagement with faces 46, 48 of the center shaft. Lubrication for this sliding movement of the guide shoe assemblies on the support shaft is provided by the pressurized hydraulic fluid in pockets 61, 61', 63, 63'. In a similar manner, the lubrication for the relative sliding motion of the inner surface of the roll shell against the stabilizing faces 56, 57 of the guide shoes is provided by the pressurized lubricant in pockets 58, 58', 59, 59'.

In the embodiment shown in FIG. 5, the spherical bushings in the hydraulic feed tubes slide axially and tilt to allow the hydraulic pressure to be maintained in chambers 114, 116 regardless of the translational position of the guide shoe assemblies 39, 41 relative to the support shaft. In addition, the guide shoe 40, by virtue of its slidable bore 81 over a piston 83 in compensating piston 75, which is sealed by ring seals 79, allows the guide shoe to move radially outwardly relative to the compensating piston 75, which increases or decreases gap 118, under the biasing pressure of the hydraulic fluid in chamber 116. The interface at gap 118 might range from metal-to-metal contact to a gap of about 0.25 cm. This permits the roll to accommodate slight differences in the dimensions and tolerances built into the components during manufacturing as well as those created during operation due to differences in the coefficients of thermal expansion of the components, such as the roll shell and roll shaft. Also, some movement of the roll shell relative to the roll shaft can be caused by operating conditions, such as the passage of a wad of paper through the nip or impurities in the lubrication fluid at the interface between the guide shoes and either the roll shell or roll shaft.

The operation of the embodiments shown in FIGS. 6 and 7 is similar to that described in conjunction with the embodiment shown in FIG. 5. Thus, in the embodiment shown in FIG. 6, chamber 116a and the relief 114a linking extension 55aa within shoe 38a have diameters sufficient for them to remain in fluid communication with hydraulic fluid conduit 55a regardless of the translational position of the guide shoe assemblies 39a, 41a along the support surface of the roll shaft. The larger diameter of the bore 81a ensures that the hydraulic pressure applied to the guide shoe 40a is sufficient for it to be able to move radially outwardly relative to the compensating shoe. Springs 120, 120' bias the guide shoe 40a outwardly relative to the compensating shoe to maintain the guide shoe in position against the inner surface of the roll shell.

In the embodiment shown in FIG. 7, hydraulic feed lines 55b, 55b' supply pressurized hydraulic fluid to the lubricating pockets as well as to the chambers 116b, 116b' in the compensating piston shoe assembly via feed lines 122, 122' to provide the pressure of the guide shoe on the compensating piston side of the apparatus against the roll shell.

In all embodiments, the pressure applied by the guide shoe against its compensating piston member by means, such as the hydraulic fluid pressure in chamber 116, or even by springs, to produce a force of its guide shoe stabilizing face against the inner surface of the roll shell is balanced by an equal reaction force created by the resulting movement of the opposite inner side of the roll shell against the stabilizing face of the opposed guide shoe. Therefore, only one side of the roll need be equipped with a compensating piston guide shoe assembly. Such an assembly 41 need not be located at or near the ends of the roll, in which case two such assemblies might not be utilized.

Accordingly, this apparatus achieves the objects of the invention and incorporates its features and advantages by providing opposed stabilizing pressure to the stabilizing shoe assemblies on either side of the roll shaft, preferably at either end of the roll to maintain the roll shell in continuous stabilized position relative to the roll shaft during operation. Naturally, variations within the skill of the artisan can be effected without departing from the spirit of the invention and scope of the claims. For example, it is contemplated that the opposed stabilizing guide shoes can be operated in conjunction with the support shoe, or shoes, on only one side of the roll. Thus, in some operating situations, support shoe 24 might be deactivated during operation and only support shoe 22 operating against a nip N with a roll, or other support, over support shoe 22. Also, it is contemplated that the stabilizing face areas of the guide pistons need not be the same. The laws of hydraulics can be utilized in a desired manner to produce the desired opposed forces against the inner roll face which is the only support surface contacted by all the support and guide elements. The principles of the roll shell stabilization provided by the operation of the guide shoes would remain the same.

What is claimed is:

1. A self-loading controlled deflection roll for use in engaging another roll, along a nip line of contact therewith, comprising, in combination:
   a stationary roll shaft having a longitudinal axis extending along a nip plane, said shaft including guide surfaces on two sides thereof on either side of the nip plane;
   a roll shell, having inner and outer cylindrical surfaces, disposed about the shaft and defining, with the shaft, a space between the shaft and the inner surface of the shell;
   support shoe means mounted on the shaft and disposed in the space to supportingly engage the inner surface of the shell and move the shell translationally relative to the shaft in the nip plane through the longitudinal axis and nip into, and out of, nipping engagement with the opposing support;
   guide shoe means for use in conjunction with the guide surfaces on both sides of the roll shaft, each guide shoe means having a support surface and a stabilizing surface with the support surface positioned for sliding movement on a guide surface and the stabilizing surface positioned for sliding engagement with the inner surface of the roll shell;
   at least one of said guide shoe means including a compensating means for permitting relative reciprocal movement between its corresponding support surface and stabilizing surface;
   hydraulic means for maintaining fluid communication between a source of pressurized hydraulic fluid and the guide shoe means to actuate the guide shoe means such that substantially equal stabilizing force is maintained at each of the interfaces between the stabilizing surfaces and inner surface of the roll shell relative to the roll shaft.

2. A self-loading controlled deflection roll as set forth in claim 1, wherein:
   the guide shoe means comprises a pair of substantially opposed guide shoes for slidably engaging corresponding guide surfaces on the roll shaft;
   the compensating means includes a compensating piston having the support surface.

3. A self-loading controlled deflection roll as set forth in claim 2, wherein:
   the guide shoe means includes an interface gap between the guide shoe and compensating piston.

4. A self-loading controlled deflection roll as set forth in claim 1, wherein:
   at least one guide shoe means includes a guide shoe having the stabilizing surface and a compensating piston having the support surface with an interface gap between the guide shoe and compensating piston to permit relative movement therebetween.

5. A self-loading controlled deflection roll as set forth in claim 4, wherein:
   the at least one guide shoe means includes a chamber between the guide shoe and compensating piston;
   the compensating piston and associated guide shoe form a piston and bore arrangement about the chamber whereby pressurized hydraulic fluid is maintained in communication with the guide shoe means while permitting reciprocal movement of the guide shoe relative to the compensating piston as the stabilizing surfaces maintain stabilizing force against the roll shell.

6. A self-loading controlled deflection roll for use in engaging another roll, along a nip line of contact therewith, comprising, in combination:
   a stationary roll shaft having a longitudinal axis extending along a nip plane, said shaft including guide surfaces on two sides thereof on either side of the nip plane;
   a roll shell, having inner and outer cylindrical surfaces, disposed about the shaft and defining, with the shaft, a space between the shaft and the inner surface of the shell;
   support shoe means mounted on the shaft and disposed in the space to supportingly engage the inner surface of the shell and move the shell translationally relative to the shaft in the nip plane through the longitudinal axis and nip into, and out of, nipping engagement with the opposing support;
   guide shoe means for using conjunction with the guide surfaces on both sides of the roll shaft, each guide shoe means having a support surface and a stabilizing surface with the support surface positioned for sliding movement on a guide surface and the stabilizing surface positioned for sliding engagement with the inner surface of the roll shell, the guide shoe means further including a guide shoe and a tube;
   at least one of said guide shoe means including a compensating means for permitting relative reciprocal movement between its corresponding support surface and stabilizing surface, the compensating means further including a compensating piston having an interface gap with an associated guide shoe, whereby the guide shoe can be biased against the compensating piston, and moved relative thereto;
   hydraulic means for maintaining fluid communication between a source of pressurized hydraulic fluid and the guide shoe means to actuate the guide shoe means such that substantially equal stabilizing force is maintained at each of the interfaces between the stabilizing surfaces and inner surface of the roll shell relative to the roll shaft;
   the tube having one end movably mounted in the roll shaft and the other end movably mounted in the compensating piston, whereby pressurized fluid communication is maintained between the hydraulic means and the guide shoe means during movement of the guide shoe means on the guide surfaces.

7. A self-loading controlled deflection roll as set forth in claim 1, wherein:
   the compensating means includes a compensating piston having the support surface for slidably engaging a guide surface on the roll shaft;
   the guide shoe means includes a pair of substantially opposed guide shoes, one of which is associated with the compensating piston and the other guide shoe having a support surface for slidably engaging a corresponding guide surface on the roll shaft;
   the guide shoe means includes an interface gap between the one guide shoe and the compensating piston;
   the one guide shoe and the compensating piston defining one or more chambers for receiving pressurized hydraulic fluid, whereby reciprocal movement between the one guide shoe and compensating piston, and corresponding movement at the interface gap can be established according to the hydraulic pressure.

8. A self-loading controlled deflection roll for use in engaging another roll, along a nip line of contact therewith, comprising, in combination:

a stationary roll shaft having a longitudinal axis extending along a nip plane, said shaft including guide surfaces on two sides thereof on either side of the nip plane;

a roll shell, having inner and outer cylindrical surfaces, disposed about the shaft and defining, with the shaft, a space between the shaft and the inner surface of the shell;

support shoe means mounted on the shaft and disposed in the space to supportingly engage the inner surface of the shell and move the shell translationally relative to the shaft in the nip plane through the longitudinal axis and nip into, and out of, nipping engagement with the opposing support;

guide shoe means for use in conjunction with the guide surfaces on both sides of the roll shaft, each guide shoe means having a support surface and a stabilizing surface with the support surface positioned for sliding movement on a guide surface and the stabilizing surface positioned for sliding engagement with the inner surface of the roll shell;

at least one of said guide shoe means including a compensating means for permitting relative reciprocal movement between the corresponding support surface and stabilizing surface;

hydraulic means for maintaining fluid communication between a source of pressurized hydraulic fluid and the guide shoe means to actuate the guide shoe means such that substantially equal stabilizing force is maintained at each of the interfaces between the stabilizing surfaces and inner surface of the roll shell relative to the roll shaft;

the guide shoe means includes a tube having one end movably mounted in the roll shaft and the other end movably mounted in the guide shoe means, whereby pressurized fluid communication is maintained between the hydraulic means and the guide shoe means during movement of guide shoe means on the guide surfaces.

9. A self-loading controlled deflection roll for use in engaging another roll, along a nip line of contact therewith, comprising, in combination:

a stationary roll shaft having a longitudinal axis extending along a nip plane, said shaft including guide surfaces on two sides thereof on either side of the nip plane;

a roll shell, having inner and outer cylindrical surfaces, disposed about the shaft and defining, with the shaft, a space between the shaft and the inner surface of the shell;

support shoe means mounted on the shaft and disposed in the space to supportingly engage the inner surface of the shell and move the shell translationally relative to the shaft in the nip plane through the longitudinal axis and nip into, and out of, nipping engagement with the opposing support;

guide shoe means for use in conjunction with the guide surfaces on both sides of the roll shaft, each guide shoe means having a support surface and a stabilizing surface with the support surface positioned for sliding movement on a guide surface and the stabilizing surface positioned for sliding engagement with the inner surface of the roll shell;

at least one of said guide shoe means including a compensating means for permitting relative reciprocal movement between its corresponding support surface and stabilizing surface;

hydraulic means for maintaining fluid communication between a source of pressurized hydraulic fluid and the guide shoe means t actuate the guide shoe means such that substantially equal stabilizing force is maintained at each of the interfaces between the stabilizing surfaces and inner surface of the roll shell relative to the roll shaft;

the guide shoe means includes a tube having one end movably mounted in the roll shaft and the other end movably mounted in the guide shoe means, the tubes in the guide shoe means include spherical bushings at least at one end thereof whereby the tube can move axially and angularly to maintain pressurized fluid communication between the hydraulic means and guide shoe means, whereby pressurized fluid communication is maintained between the hydraulic means and the guide shoe means during movement of guide shoe means on the guide surfaces.

10. A self-loading controlled deflection roll for use in engaging another roll, along a nip line of contact therewith, comprising, in combination:

a stationary roll shaft having a longitudinal axis extending along a nip plane, said shaft including guide surfaces on two sides thereof on either side of the nip plane;

a roll shell, having inner and outer cylindrical surfaces, disposed about the shaft and defining, with the shaft, a space between the shaft and the inner surface of the shell;

support shoe means mounted on the shaft and disposed in the space to supportingly engage the inner surface of the shell and move the shell translationally relative to the shaft in the nip plane through the longitudinal axis and nip into, and out of, nipping engagement with the opposing support;

guide shoe means, including a tube having one end movably mounted in the roll shaft and the other end movably mounted in the guide shoe means, for use in conjunction with the guide surfaces on both sides of the roll shaft, each guide shoe means having a support surface and a stabilizing surface with the support surface positioned for sliding movement on a guide surface and the stabilizing surface positioned for sliding engagement with the inner surface of the roll shell;

at least one of said guide shoe means including a compensating means for permitting relative reciprocal movement between its corresponding support surface and stabilizing surface;

hydraulic means comprising a conduit within the roll shaft for maintaining fluid communication between a source of pressurized hydraulic fluid and the guide shoe means to actuate the guide shoe means such that substantially equal stabilizing force is maintained at each of the interfaces between the stabilizing surfaces and inner surface of the roll shell relative to the roll shaft;

the roll shaft includes a bore linking the hydraulic means and guide shoe means;

the tubes include spherical bushings at either end of the tube with one spherical bushing movably mounting the tube in a bore in the roll shaft and the to the spherical bushing movably mounting the tube in the guide shoe means to maintain fluid communication between the hydraulic means and the guide shoe means.

11. A self-loading controlled deflection roll for use in engaging another roll along a nip line of contact therewith, comprising, in combination:

a stationary roll shaft having a longitudinal axis extending along a nip plane, said shaft including a pair of parallel guide surfaces near either end thereof on either side of the nip plane and substantially parallel thereto;

a roll shell, having inner and outer cylindrical surfaces, disposed about the shaft and defining, with the shaft, a space between the shaft and the inner surface of the shell;

support shoe means mounted on the shaft and disposed in the space to supportingly engage the inner surface of the roll shell to move the shell translationally relative to the shaft in the nip plane through the longitudinal axis and nip into, and out of, nipping engagement with the opposing roll;

guide shoe means for use in conjunction with the guide surfaces on the roll shaft, each guide shoe means having a support surface and a stabilizing surface with the support surface positioned for sliding movement on a guide surface and the stabilizing surface positioned for sliding engagement with the inner surface of the roll shell;

at least one of said guide shoe means at each end of the roll shaft including a guide shoe and a compensating means for permitting relative reciprocal movement between its corresponding support surface and stabilizing surface;

hydraulic means for maintaining fluid communication between a source of pressurized hydraulic fluid and the guide shoe means to actuate each of the guide shoes associated with a compensating means, whereby a stabilizing force is produced between the stabilizing surface of the guide shoe against the inner surface of the roll shell, and a substantially equal reaction stabilizing force is induced between the stabilizing surface of the opposed guide shoe means and the inner surface of the roll shell.

12. A self-loading controlled deflection roll as set forth in claim 11, wherein:

at least one of the compensating means includes a compensating piston having an interface gap with a associated guide shoe, whereby the guide shoe can be biased against the compensating piston by the hydraulic means.

* * * * *

UNITED STATES PATENT AND TRADEMARK OFFICE
CERTIFICATE OF CORRECTION

PATENT NO. :    5,060,357
DATED      :    10/29/91
INVENTOR(S) :   Arnold J. Roerig, Dale A. Brown It is certified that error appears in the above—identified patent and that said Letters Patent is hereby corrected as shown below:

Column 10, line 15:    "using" should read --use in--.

Column 12, line 3:     "t" should read --to--.

Column 12, line 65:    "to the" should read --other--.

Signed and Sealed this

Second Day of March, 1993

*Attest:*

STEPHEN G. KUNIN

*Attesting Officer*     Acting Commissioner of Patents and Trademarks